(12) United States Patent
Lee et al.

(10) Patent No.: US 9,511,800 B2
(45) Date of Patent: Dec. 6, 2016

(54) APPARATUS AND METHOD FOR CONTROLLING HEAD-IN PERPENDICULAR PARKING OF VEHICLE, AND SYSTEM FOR HEAD-IN PERPENDICULAR PARKING OF VEHICLE WITH THE APPARATUS

(71) Applicant: HYUNDAI MOBIS CO., LTD., Seoul (KR)

(72) Inventors: Dong Won Lee, Yongin-si (KR); Han Wook Bae, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 198 days.

(21) Appl. No.: 14/162,258

(22) Filed: Jan. 23, 2014

(65) Prior Publication Data
US 2015/0151789 A1 Jun. 4, 2015

(30) Foreign Application Priority Data
Nov. 29, 2013 (KR) .................. 10-2013-0146977

(51) Int. Cl.
| | | |
|---|---|---|
| *A01B 69/00* | (2006.01) | |
| *B62D 6/00* | (2006.01) | |
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *B62D 15/02* | (2006.01) | |
| *B62D 5/04* | (2006.01) | |
| *G08G 1/16* | (2006.01) | |

(52) U.S. Cl.
CPC ........... *B62D 15/0285* (2013.01); *B62D 5/046* (2013.01); *G08G 1/165* (2013.01)

(58) Field of Classification Search
CPC .................................................. B62D 15/0265
USPC ........................................................ 701/41
See application file for complete search history.

(56) References Cited

FOREIGN PATENT DOCUMENTS

| DE | 103 31 948 A1 | 2/2005 | |
|---|---|---|---|
| DE | 10 2007 027438 A1 | 12/2008 | |
| DE | 102007027438 A1 * | 12/2008 | ............ B60W 30/06 |
| DE | 10 2011 084943 A1 | 4/2013 | |
| DE | 102011084943 A1 * | 4/2013 | ........... B62D 15/027 |
| DE | 10 2011 122421 A1 | 6/2013 | |

(Continued)

OTHER PUBLICATIONS

English Translation for DE 102011084943A1.*

(Continued)

*Primary Examiner* — Helal A Algahaim
*Assistant Examiner* — Mahmoud Ismail
(74) *Attorney, Agent, or Firm* — NSIP Law

(57) ABSTRACT

The present invention relates to an apparatus and a method for controlling head-in perpendicular parking of a vehicle, which front the vehicle to be subjected to head-in perpendicular parking in a parking area positioned perpendicular to a fronting direction of the vehicle to be parked, and a system for perpendicular head-in parking of the vehicle with the apparatus. The present invention has been made in an effort to provide an apparatus and a method for head-in perpendicular parking of a vehicle, which support a head-in perpendicular parking method and a system for head-in perpendicular parking of a vehicle with the apparatus.

19 Claims, 17 Drawing Sheets

(56) References Cited

FOREIGN PATENT DOCUMENTS

| EP | 2 364 898 A1 | 9/2011 | |
|---|---|---|---|
| EP | 2 620 351 A2 | 7/2013 | |
| KR | 10-2009-0036794 A | 4/2009 | |
| WO | WO 2011/009653 A1 | 1/2011 | |
| WO | WO 2011155349 A1 * | 12/2011 | ......... B62D 15/0265 |

OTHER PUBLICATIONS

English Translation for DE 102007027438A1.*
English Translation of WO2011155349.*
Extended European Search Report mailed March 10, 2015 in counterpart European patent application No. 14152676.4 (9 pages, in English).

* cited by examiner

APPARATUS AND METHOD FOR CONTROLLING HEAD-IN PERPENDICULAR PARKING OF VEHICLE, AND SYSTEM FOR HEAD-IN PERPENDICULAR PARKING OF VEHICLE WITH THE APPARATUS

CROSS-REFERENCE TO RELATED APPLICATIONS

This application claims priority to and the benefit of Korean Patent Application No. 10-2013-0146977 filed in the Korean Intellectual Property Office on Nov. 29, 2013, the entire contents of which are incorporated herein by reference.

TECHNICAL FIELD

The present invention relates to an apparatus and a method for controlling head-in perpendicular parking of a vehicle, which front the vehicle to be subjected to head-in perpendicular parking in a parking area positioned perpendicular to a fronting direction of the vehicle to be parked, and a system for perpendicular head-in parking of the vehicle with the apparatus.

BACKGROUND ART

In recent years, vehicles such as an automobile, and the like have been a necessity for modern people and thus, new vehicles have been rapidly released and operated, and as a result, various social problems such as traffic congestion and a parking problem have occurred.

In particular, the parking problem has become a serious issue, and as a result, as the number of vehicles increase in limited areas, cities, and nations, parking areas where the vehicles can be parked cannot but be reduced and a parking section sectioned to park one vehicle has been gradually narrowed in order to solve an insufficient parking area.

When multiple vehicles are together parked even in a parking area without a parking section, a gap between the vehicles cannot be narrow and in this case, it is difficult that a driver visually checks surrounding obstacles and personally drives a vehicle to park the vehicle in a narrow parking area or evacuate the vehicle from the narrow parking area.

In recent years, a technology has also been developed and released, which installs an automatic parking system in a vehicle and automatically parks the vehicle by checking images obtained by photographing surroundings of the vehicle in the automatic parking system. The automatic parking system assists parking by automatically steering the vehicle or assists parallel parking by sensing surrounding obstacles with a distance sensor by installing the distance sensor, and the like on the side of the vehicle when the driver performs perpendicular or parallel parking in the parking area by using a camera installed at the rear of the vehicle.

However, the general automatic parking system just gives an alarm by sensing the obstacles or notifies the driver that there is a risk that the vehicle will collide with the obstacles while automatically parking the vehicle and does not generate an accurate path for evading the obstacles in the parking area, and as a result, the driver needs to determine a path to avoid the obstacles visually or using another equipment or avoid the obstacles by personally driving the vehicle. Therefore, a driver's convenience cannot be considered.

Korean Patent Application Laid-Open No. 2009-0036794 discloses a parking assisting device. However, this device supports a perpendicular back-in parking method and is impossible to support a perpendicular head-in parking method.

SUMMARY OF THE INVENTION

The present invention has been made in an effort to provide an apparatus and a method for head-in perpendicular parking of a vehicle, which support a head-in perpendicular parking method and a system for head-in perpendicular parking of a vehicle with the apparatus.

An exemplary embodiment of the present invention provides an apparatus for controlling head-in orthogonal parking of a vehicle, the apparatus including: a parking area detecting unit configured to detect a parking area; a backward control unit configured to generate a backward path based on positional information of obstacles positioned within a predetermined distance from the parking area and back the vehicle based on the backward path; a head-in parking determination unit configured to judge whether head-in parking in the parking area is available; a forward control unit configured to generate a forward path based on the positional information of the obstacles or positional information of a sectioning line to determine the parking area when it is judged that head-in parking in the parking area is unavailable and front the vehicle based on the forward path; a main control unit configured to repeat a backward control and a forward control of the vehicle until it is judged that head-in parking in the parking area is available; and a parking control unit configured to generate a parking path based on the positional information of the obstacles or the positional information of the sectioning line when it is judged that head-in parking in the parking area is available and park the vehicle based on the parking path.

The parking control unit may finally park the vehicle by aligning a temporarily parked vehicle according to the parking path based on positional information of an obstacle or a sectioning line positioned at least one side of the parking area.

When the obstacle or the sectioning line is positioned at both sides of the parking area, the parking control unit may compare distances from the temporarily parked vehicle to each obstacle or each sectioning line positioned at both sides of the parking area to align the temporarily parked vehicle, and when the obstacle or the sectioning line is positioned only at one side of the parking area, the parking control unit may align the temporarily parked vehicle so as to maintain a designated distance from the obstacle or the sectioning line positioned at one side of the parking area.

The backward control unit may calculate a reachable location and a rotational angle up to the location and generate the backward path based on the reachable location and the rotational angle.

The backward control unit may calculate a turning center point of the vehicle, calculate a turning radius from a present location to a front outermost point, and calculate the rotational angle so that a nearest point from the obstacles to the front outermost point is larger than a collision avoidance margin.

The backward control unit may calculate the turning radius based on an overall length of the vehicle, an overall width of the vehicle, and a rear overhang and calculate a nearest point from the obstacles to the front outermost point by using a difference value between the turning center point and the turning radius.

The backward control unit may calculate the reachable location based on a turning radius in the first backing, an overall width of the vehicle, a rear overhang, an initial location of the vehicle, an initial heading angle of the vehicle, a width of a road where the vehicle is driven, and a front/rear collision avoidance margin of the vehicle, in initial fronting.

The backward control unit may calculate the reachable location based on a minimum turning radius of the vehicle, an overall width of the vehicle, a rear overhang, a previous location of the vehicle, a previous heading angle of the vehicle, a width of a road where the vehicle is driven, and a front/rear collision avoidance margin of the vehicle, from subsequent backing in the initial backing.

The head-in parking determination unit may calculate the front collision avoidance margin of the vehicle and compare the front collision avoidance margin and a reference value to determine whether head-in parking in the parking area is available.

The head-in parking determination unit may calculate the front collision avoidance margin based on the target location of the vehicle, the overall length of the vehicle, the rear overhang, the target heading angle of the vehicle, and the overall width of the vehicle.

The forward control unit may calculate a reachable location and a rotational angle up to the location, and generate the forward path based on the reachable location and the rotational angle.

The forward control unit may calculate the reachable location based on the target location of the vehicle, the overall length of the vehicle, the rear overhang, the target heading angle of the vehicle, and the overall width of the vehicle.

Another exemplary embodiment of the present invention provides a method for controlling head-in orthogonal parking of a vehicle, the method including: detecting a parking area; generating a backward path based on positional information of obstacles positioned within a predetermined distance from the parking area and backing the vehicle based on the backward path; judging whether head-in parking in the parking area is available; generating a forward path based on the positional information of the obstacles or positional information of a sectioning line to determine the parking area when it is judged that head-in parking in the parking area is unavailable and fronting the vehicle based on the forward path repeating a backward control and a forward control of the vehicle until it is judged that head-in parking in the parking area is available; and generating a parking path based on the positional information of the obstacles or the positional information of the sectioning line when it is judged that head-in parking in the parking area is available and parking the vehicle based on the parking path.

In the parking of the vehicle, the vehicle may be finally parked by aligning a temporarily parked vehicle according to the parking path based on positional information of an obstacle or a sectioning line positioned at least one side of the parking area.

In the backing of the vehicle and the fronting of the vehicle, a reachable location and a rotational angle up to the location may be calculated and the backward path may be generated based on the reachable location and the rotational angle.

In the judging, the front collision avoidance margin of the vehicle may be calculated and the front collision avoidance margin and a reference value may be compared to determine whether head-in parking in the parking area is available.

Yet another exemplary embodiment of the present invention provides a system for head-in perpendicular parking of a vehicle, the system including: a head-in perpendicular parking controlling apparatus including a parking area detecting unit configured to detect a parking area; a backward control unit configured to generate a backward path based on positional information of obstacles positioned within a predetermined distance from the parking area and back the vehicle based on the backward path; a head-in parking determination unit configured to judge whether head-in parking in the parking area is available; a forward control unit configured to generate a forward path based on the positional information of the obstacles or positional information of a sectioning line to determine the parking area when it is judged that head-in parking in the parking area is unavailable and front the vehicle based on the forward path; a main control unit configured to repeat a backward control and a forward control of the vehicle until it is judged that head-in parking in the parking area is available; and a parking control unit configured to generate a parking path based on the positional information of the obstacles or the positional information of the sectioning line when it is judged that head-in parking in the parking area is available; a steering angle calculating unit configured to calculate a steering angle for following the parking path; and a motor driven power steering (MDPS) control unit configured to park the vehicle by controlling the MDPS based on the steering angle.

According to exemplary embodiments of the present invention, automatic parking can be enabled even in head-in parking in addition to the existing back-in parking by supporting a head-in perpendicular parking method. Necessity of head-in perpendicular parking has attracted public attentions due to an environmental problem in recent years. The present invention can also solve the problem due to the environmental problem.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
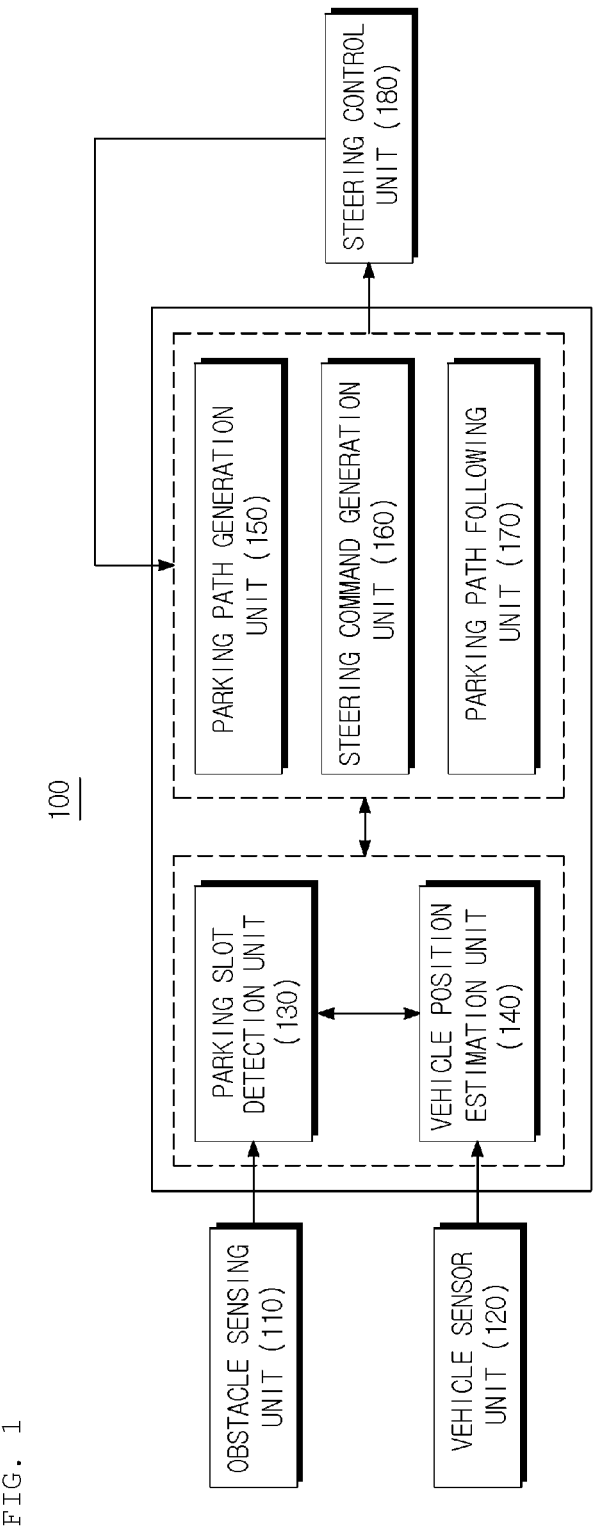
FIG. 1 is a conceptual diagram of a parking assisting system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention according to the present invention will be described in detail with reference to the accompanying drawings. In the figures, even though the parts are illustrated in different drawings, it should be understood that like reference numbers refer to the same or equivalent parts of the present invention throughout the several figures of the drawing. When it is judged that specific description on known configurations or functions related in the description of the present disclosure may unnecessarily obscure the essentials of the present disclosure, the detailed description will be omitted. Hereinafter, exemplary embodiment of the present disclosure will be described. However, it should be understood that a technical spirit of the invention is not limited to the specific embodiments, but may be changed or modified by those skilled in the art.

The present invention proposes a system that implements head-in perpendicular parking without adding the existing parking assisting system or a user's input.

FIG. 1 is a conceptual diagram of a parking assisting system according to an exemplary embodiment of the present invention.

In recent years, parking areas requiring head-in perpendicular parking, which include a basement garage of an apartment complex or a flowerbed, have been increased. However, the existing parking assisting system supports only back-in perpendicular parking. A parking assisting system 100 according to the present invention relates to a system that supports head-in perpendicular parking and may be implemented by adding only head-in parking path control logic without adding a separate additional device to the existing parking assisting system or a driver's judgment.

An obstacle sensing unit 110 serves to sense side obstacles.

A parking area generating unit 130 serves to recognize a parking area based on obstacle information.

A vehicle sensor unit 120 serves to measure state information of a vehicle. The vehicle sensor unit 120 measures a wheel pulse, a steering angle, a speed, a yaw rate, and the like as the state information of the vehicle.

A vehicle position calculating unit 140 serves to estimate a present location of the vehicle based on the state information of the vehicle.

A target path generating unit 150 serves to generate a target path from the recognized parking area and the present vehicle location. The target path generating unit 150 generates a target path for head-in perpendicular parking.

A steering command generating unit 160 serves to calculate a steering angle according to the target path.

A steering control unit 180 serves to perform a steering control based on the steering angle.

A path following unit 170 serves to modify the target path and control path following when the present location is out of a target location during the steering control.

Figure 2A:
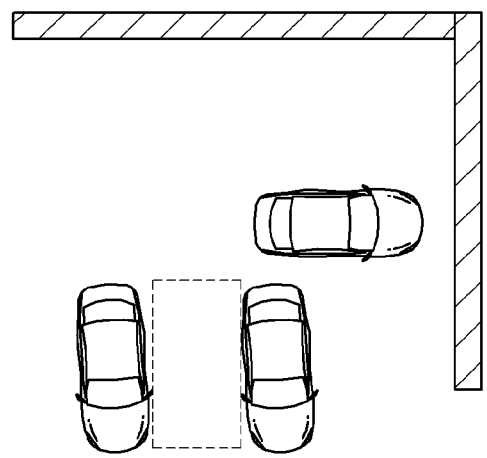
FIGS. 2A to 2H are conceptual diagrams illustrating a parking assisting process.
Figure 2B:
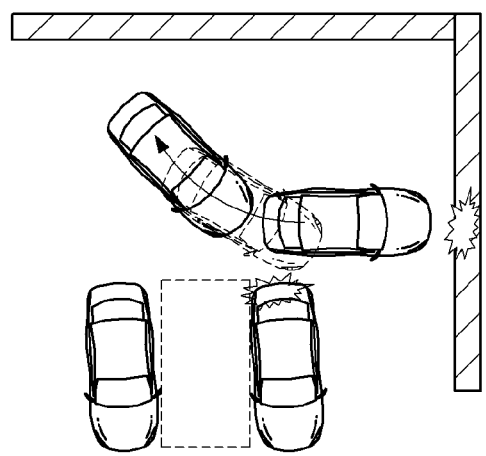
Figure 2C:
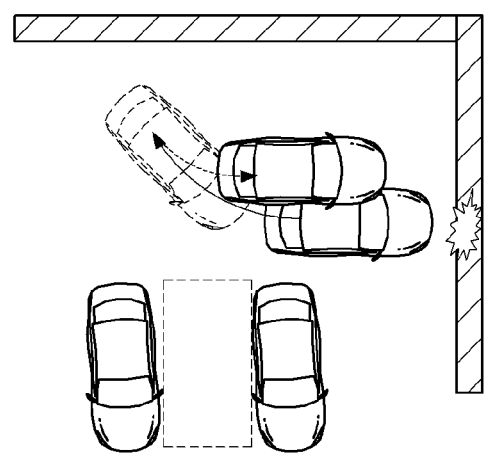
Figure 2D:
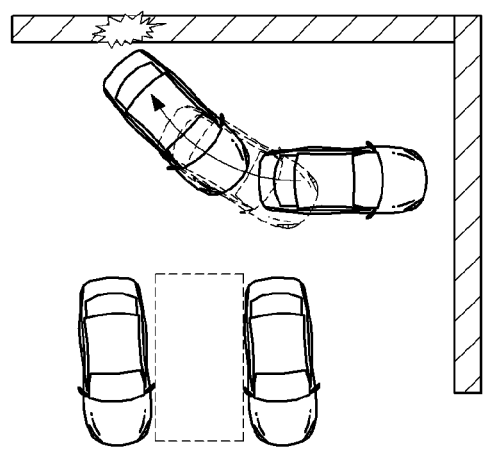
Figure 2E:
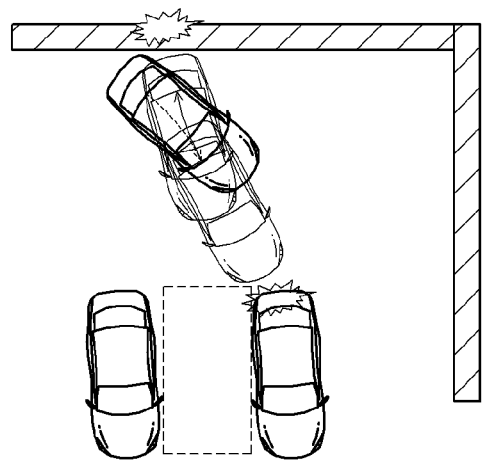
Figure 2F:
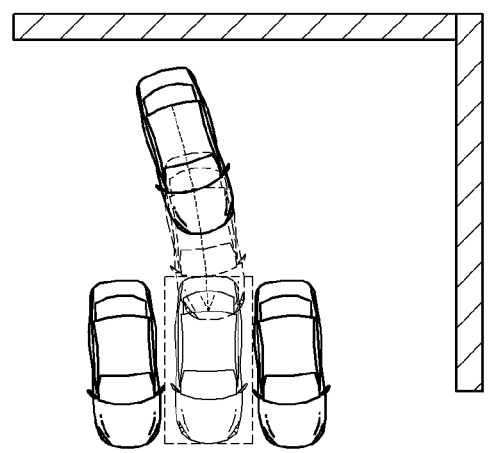
Figure 2G:
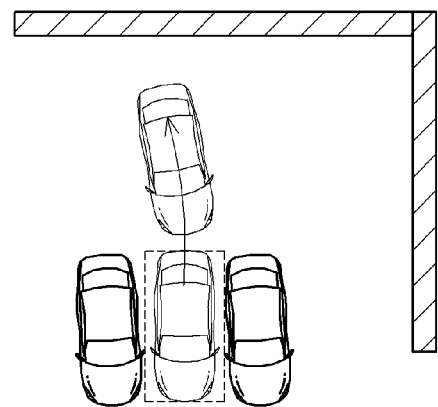
Figure 2H:
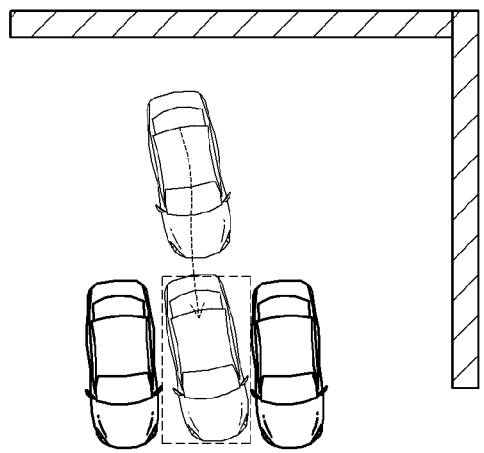
Figure 3:
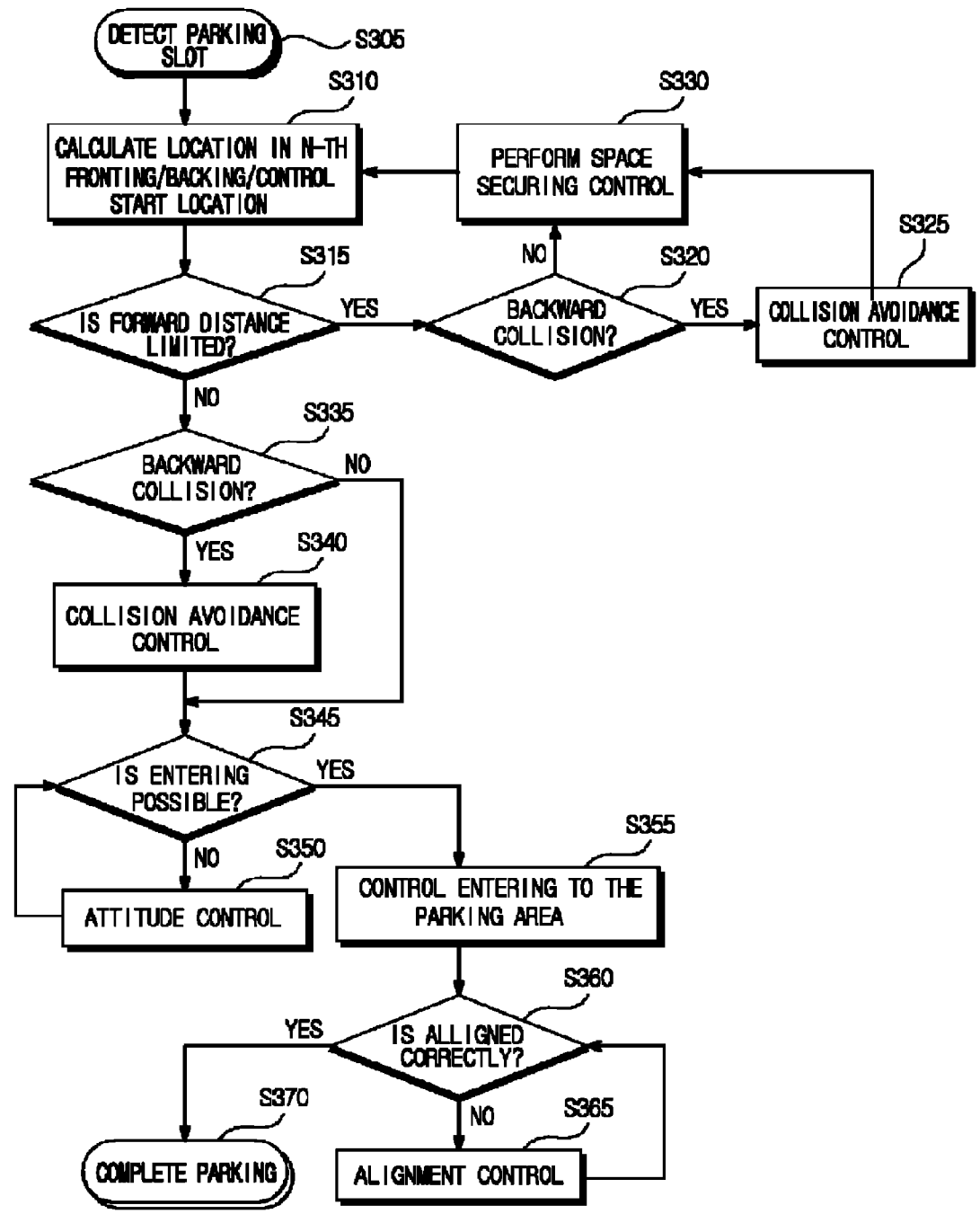
FIG. 3 is a flowchart sequentially illustrating a parking assisting method of the parking assisting system illustrated in FIG. 1.
Figure 4A:
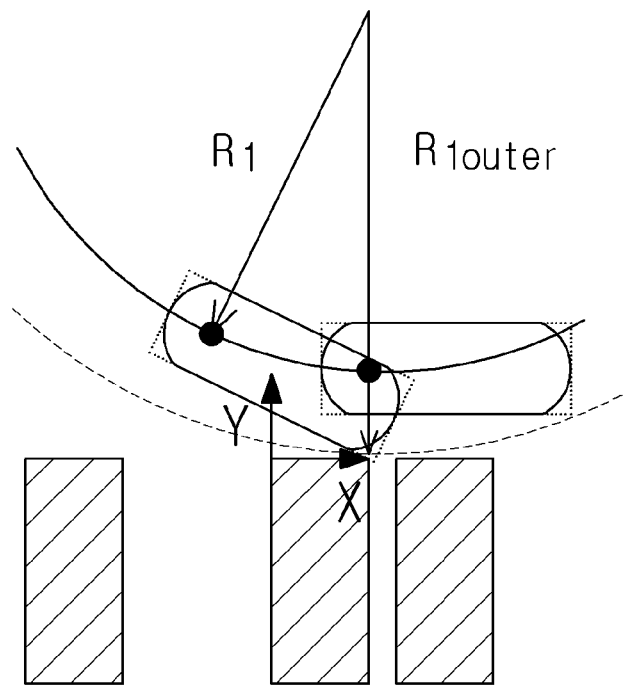
FIGS. 4A to 6 are reference diagrams for describing a method for calculating a turning radius for evading a collision in first back turning.
Figure 4B:
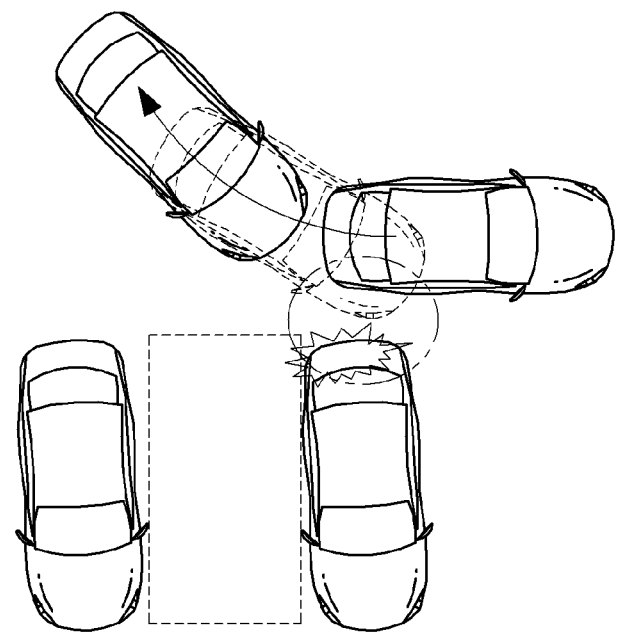
Figure 5:
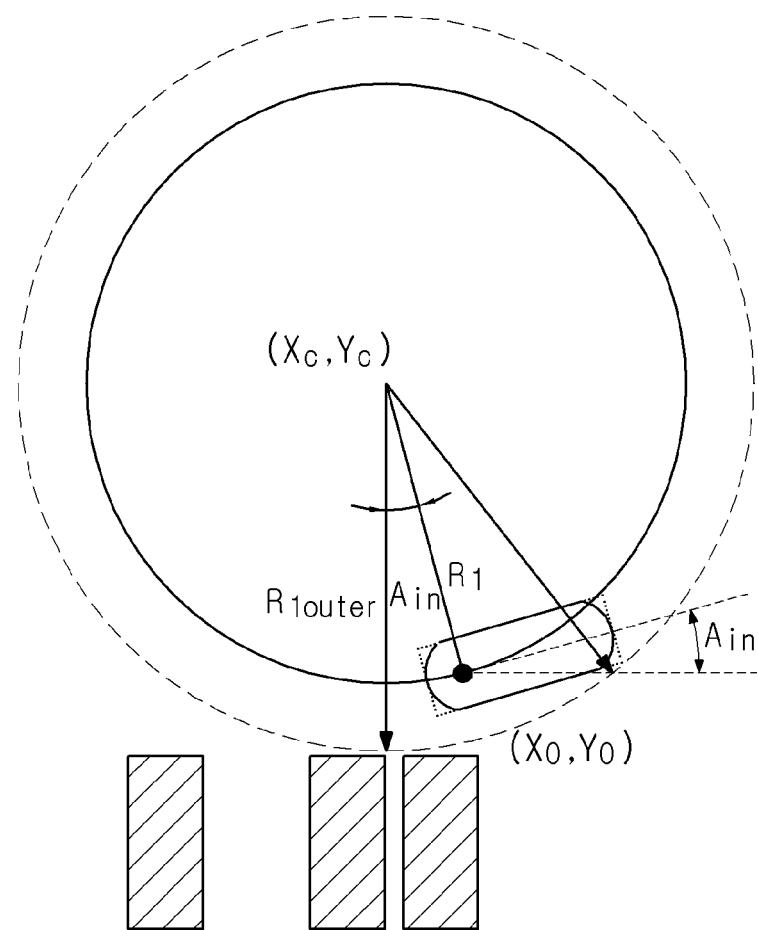
Figure 6:
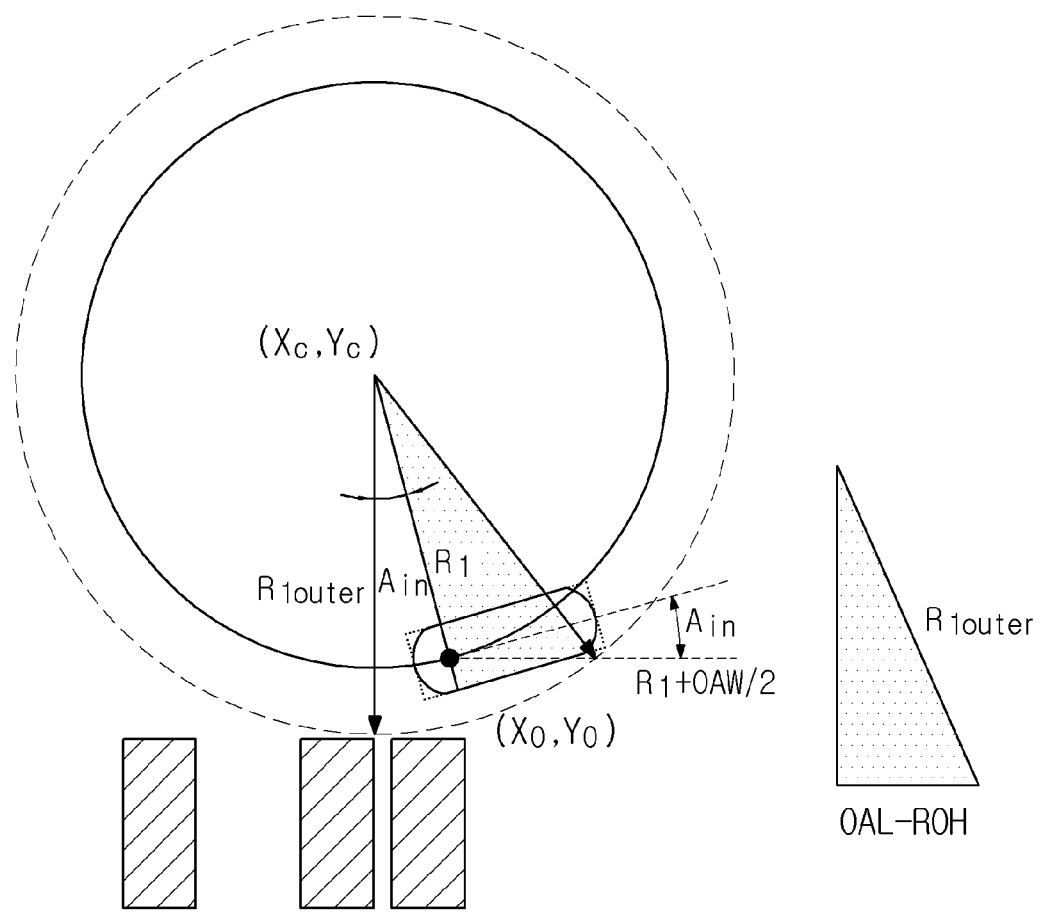

FIGS. 2A to 2H are conceptual diagrams illustrating a parking assisting process. FIG. 3 is a flowchart sequentially illustrating a parking assisting method of the parking assisting system illustrated in FIG. 1. The following description will be made with reference to FIGS. 2A to 3.

The method for controlling head-in perpendicular parking in the parking assisting system 100 follows a sequence described below.

First, a parking area is searched (S305). FIG. 2A illustrates the parking area searching, that is, step S305.

Thereafter, a position and an angle which are reachable in an N-th fronting/backing are calculated (S310). In this case, a whole parking path is calculated based on the reachable position and angle and a control start location is determined to reach the target location.

Thereafter, when there is a collision risk in the fronting (S335), an evading control is performed (S340). Meanwhile, when a forward distance is limited (S315) such that the control start location may not be reached, a space securing control is executed through the fronting/backing (S330). In this case, the location reachable in the N-th fronting/backing is recalculated and the control start location is adjusted. It is to be noted that as a distance from the obstacle increases, the control start location is shortened.

When there is no probability of a backward collision (S320), the space securing control is immediately executed, but when there is a probability of the backward collision (S320), the evading control is executed (S325) and thereafter, the space securing control is executed. FIG. 2B illustrates the evading control, that is, steps S340 and S325 and FIG. 2C illustrates the space securing control, that is, step S330. FIG. 2D exemplifies the backward collision.

Thereafter, an attitude control is performed (S350) until entering is possible (S345) and when entering is possible (S345), an entering control is performed (S355). FIG. 2E illustrates the attitude control, that is, step S350 and FIG. 2F illustrates the entering control, that is, step S355.

An alignment is checked by comparing left and right spaces after entering (S360) and when the alignment is not satisfied, an alignment correction control is performed (S365) and when the alignment is satisfied, parking is completed (S370). FIG. 2G illustrates the alignment correction control, that is, step S365 and FIG. 2H is an exemplary diagram when the alignment is satisfied.

For head-in perpendicular parking of the vehicle, the target path which conforms therewith needs to be generated. Hereinafter, a process in which the target path generating unit 150 generates the target path for the head-in perpendicular parking will be described.

(1) Calculating Turning Radius for Evading a Collision in First Back Turning

FIGS. 4A to 6 are reference diagrams for describing a method for calculating a turning radius for evading a collision in first back turning.

The target path generating unit 150 checks whether a front edge of the vehicle collides in the first back turning and thereafter, calculates the turning radius for evading the collision. A sequence thereof will be described below.

① A turning center point of the vehicle is calculated.

$$Y_c = Y_0 + R_1 \cos A_0$$

In the equation, $Y_c$ represents the turning center point. $Y_0$ represents an initial vehicle Y location and $A_0$ represents an initial vehicle heading angle. $R_1$ represents a first back turning radius.

② A turning radius of a front outermost point of the vehicle is calculated.

$$R_{1outer} = \sqrt{(R_1 + OAW/2)^2 + (OAL - ROH)^2}$$

In Equation 1, $R_{1outer}$ represents the turning radius of the front outermost point of the vehicle. OAW represents an overall width of the vehicle and OAL represents an overall length of the vehicle. ROH represents a rear overhang.

③ A nearest point from the obstacle to the front outermost point of the vehicle is set to be larger than a collision avoidance margin.

$$Y_{near} = Y_c - R_{1outer} = Y_0 + R_1 \cos A_0 - R_{1outer} \geq M_1$$

In the equation, $Y_{near}$ represents the nearest point from the obstacle to the front outermost point of the vehicle. $M_1$ represents the collision avoidance margin in the back turning.

④ When the equation of ② and the equation of ③ are developed, a second-order equation for R1 may be induced as follows.

$$Y_0 + R_1 \cos A_0 - R_{1outer} \geq M_1 (1 - \cos^2 A_0) R_1^2 + [OAW - 2 \cos A_0 (Y_0 - M_1)] R_1 + (OAL - ROH)^2 + OAW^2/4 - (Y_0 - M_1)^2 \leq 0$$

Then, the turning radius $R_1$ for evading the collision in the back turning may be calculated therefrom.

(2) Calculating Location Reachable in First Backing

Figure 7:
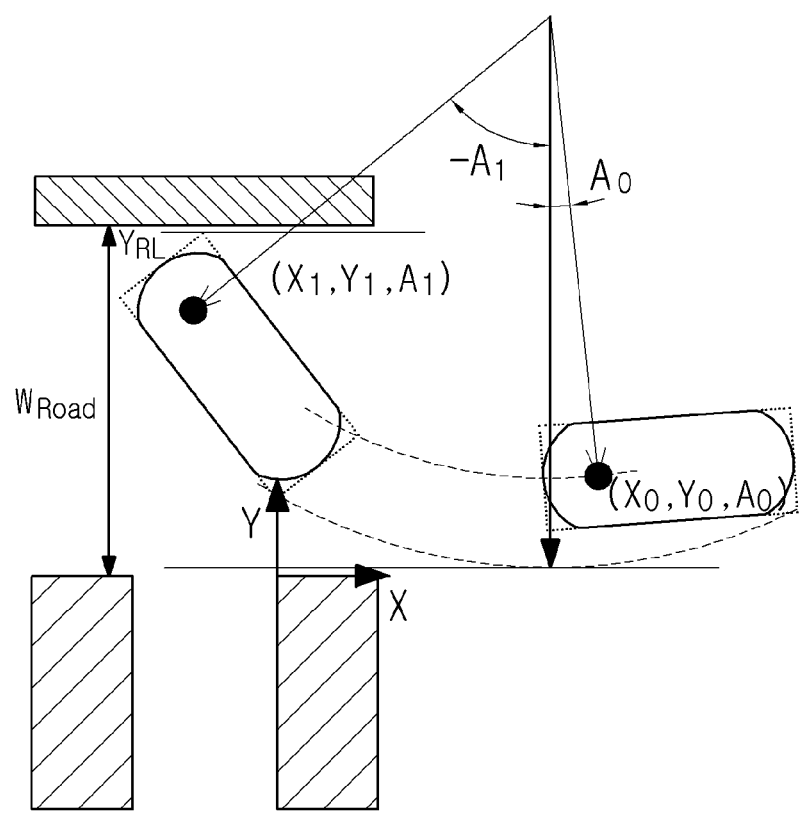
FIG. 7 is a reference diagram for describing a method for calculating a position which is reachable in first backing.

FIG. 7 is a reference diagram for describing a method for calculating a position which is reachable in first backing.

① When an angle which is reached in the first backing is represented by $A_1$, reaching locations $X_1$ and $Y_1$ may be calculated as below.

$$X_1 = X_0 - R_1 (\sin A_0 - \sin A_1)$$

$$Y_1 = Y_0 + R_1 (\cos A_0 - \cos A_1)$$

In the equations, (X1, Y1) represents a reaching location coordinate of the vehicle and $(X_0, Y_0)$ represents an initial location coordinate of the vehicle. $A_0$ represents a vehicle heading angle at $(X_0, Y_0)$ and $A_1$ represents a vehicle heading angle at $(X_1, Y_1)$.

② The vehicle needs to be stopped when a Y value of a rear outermost point of the vehicle is equal to a difference value between a road width and a collision avoidance margin in order to avoid the collision in the backing. The Y value of the rear outermost point of the vehicle may be acquired therefrom as described below.

$$Y_{RL} = Y_1 - ROH \times \sin A_1 + OAW/2 \times \cos A_1 = W_{Road} - M_{FR}$$

In the equation, $Y_{RL}$ represents the Y value of the rear outermost point of the vehicle. $W_{Road}$ represents the road width and $M_{FR}$ represents a front/rear collision avoidance margin.

③ A1 is summarized below from the equation of ① and the equation of ②.

$$(R_1 - OAW/2) \cos A_1 + ROH \times \sin A_1 = Y_0 + R_1 \cos A_0 - W_{Road} + M_{FR}$$

(3) Calculating Location Reachable in N-th Backing

Figure 8:
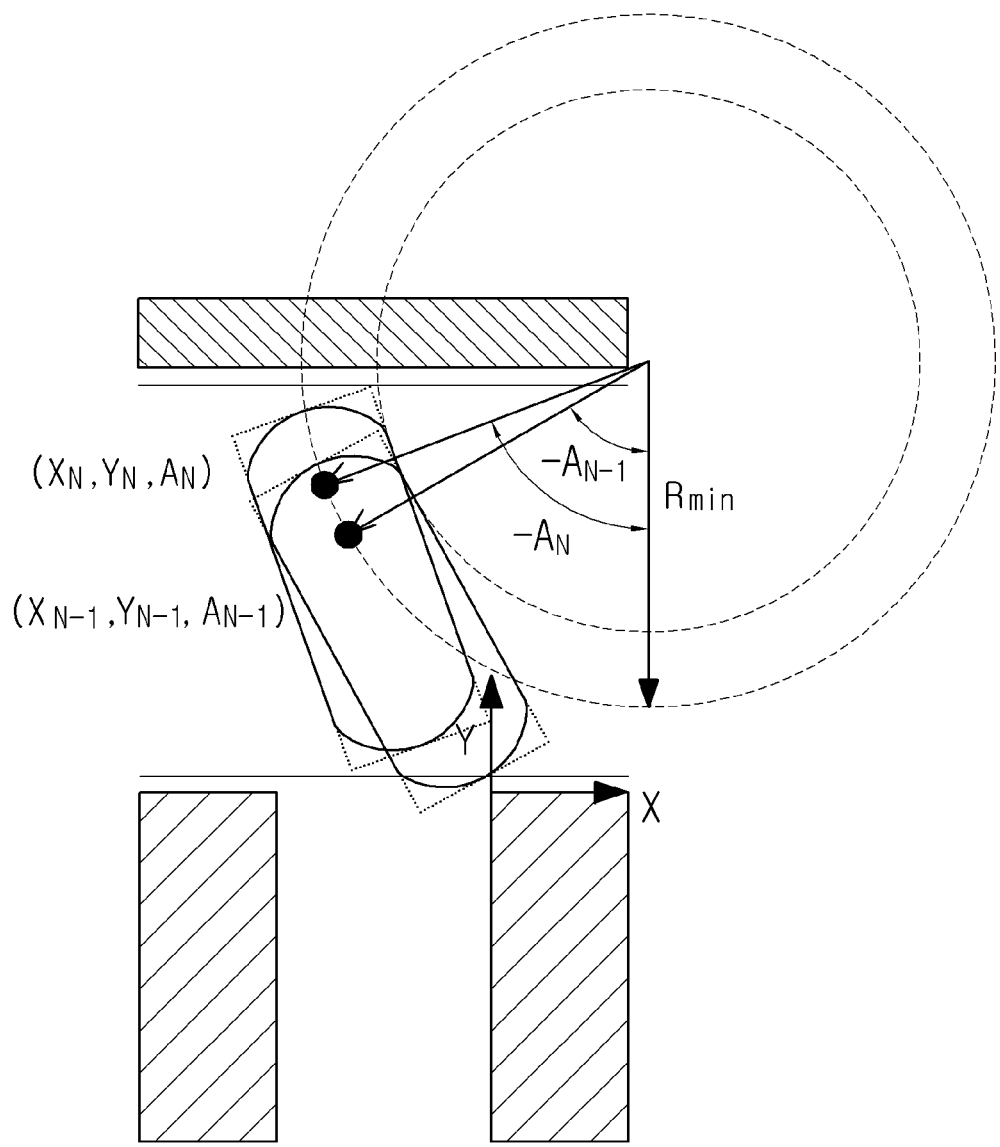
FIG. 8 is a reference diagram for describing a method for calculating a position which is reachable in N-th backing.

FIG. 8 is a reference diagram for describing a method for calculating a position which is reachable in N-th backing.

① On the assumption that the angle reached in N-th backing is represented by $A_N$, reaching locations $X_N$ and $Y_N$ are calculated. $X_{N-1}$, $Y_{N-1}$, and $A_{N-1}$ are calculated in an N−1-th fronting as a previous step.

$$X_N = X_{N-1} + R_{min} \times \sin(-A_{N-1}) - R_{min} \times \sin(-A_N) = Y_{N-1} - R_{min} \times (\sin A_{N-1} - \sin A_N)$$

$$Y_N = Y_{N-1} + R_{min} \times \cos(-A_{N-1}) - R_{min} \times \cos(-A_N) = Y_{N-1} + R_{min} \times (\cos A_{N-1} - \cos A_N)$$

② The vehicle needs to be stopped when the Y value of the rear outermost edge of the vehicle is equal to the difference value between the road width and the collision avoidance margin in order to avoid the collision in the backing. The Y value of the rear outermost edge of the vehicle may be acquired therefrom as described below.

$$Y_{RL} = Y_N - ROH \times \sin A_N + OAW/2 \times \cos A_N = W_{Road} - M_{FR}$$

③ $A_N$ is summarized below from the equation of ① and the equation of ②.

$$(R_{min} - OAW/2) \cos A_N + ROH \times \sin A_N = Y_{N-1} + R_{min} \cos A_{N-1} - W_{Road} + M_{FR}$$

In the equation, $R_{min}$ represents a minimum rotational radius.

④ When $A_N$ is calculated, $X_N$ and $Y_N$ may be acquired.

(4) Calculating Reachable Location in N-th Fronting

Figure 9A:
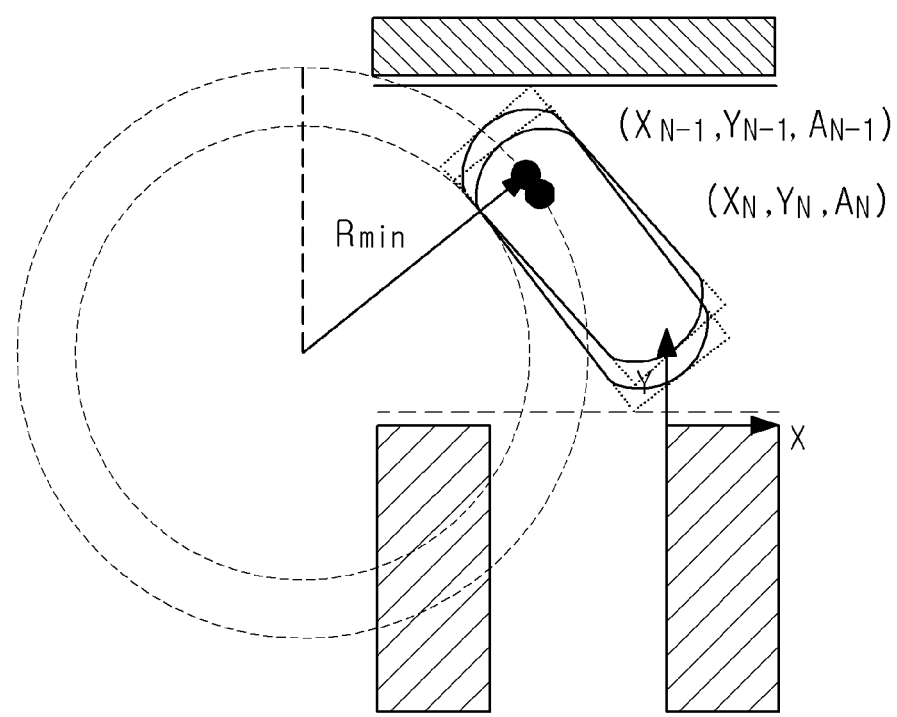
FIGS. 9A and 9B are reference diagrams for describing a method for calculating a position which is reachable in an N-th fronting.
Figure 9B:
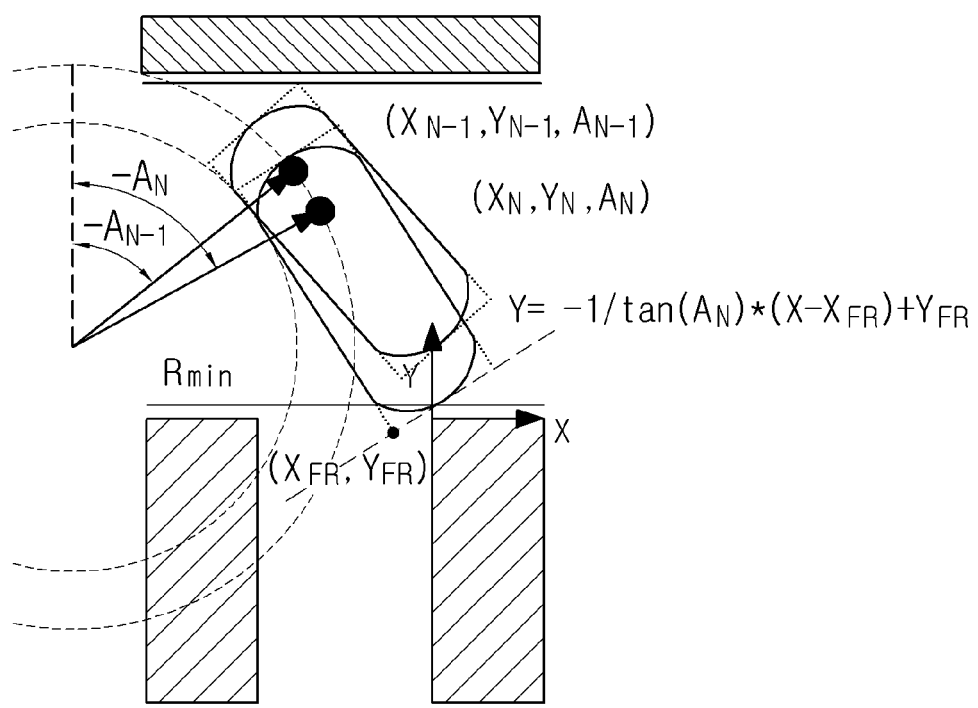

FIGS. 9A and 9B are reference diagrams for describing a method for calculating a position which is reachable in N-th fronting. FIG. 9A illustrates a case in which space entering is impossible and FIG. 9B illustrates a case in which space entering is possible.

① On the assumption that the angle reached in N-th backing is represented by $A_N$, reaching locations $X_N$ and $Y_N$ are calculated. $X_{N-1}$, $Y_{N-1}$, and $A_{N-1}$ are calculated in N-th fronting as a previous step.

$$X_N = X_{N-1} + R_{min} \times (\sin A_{N-1} - \sin A_N)$$

$$Y_N = Y_{N-1} - R_{min} \times (\cos A_{N-1} - \cos A_N)$$

② On the assumption that the vehicle is not capable of entering the inside of the parking area, $A_{N-1}$ is calculated. The vehicle needs to be stopped when the Y value at the front outermost point of the vehicle is equal to the collision avoidance margin in order to avoid the collision in the fronting. The Y value of the front outermost point of the vehicle may be acquired therefrom as described below.

$$Y_{FR} = Y_N (OAL - ROH) \times \sin A_N - OAW/2 \times \cos A_N = M_{FR}$$

In the equation, $Y_{FR}$ represents the Y value of the front outermost point of the vehicle.

$A_N$ is summarized below from the equation of ① and the equation of ②.

$$(R_{min} - OAW/2) \cos A_N + (OAL - ROH) \times \sin A_N = -Y_{N-1} + R_{min} \cos A_{N-1} + M_{FR}$$

③ Meanwhile, an X value at the front outermost point of the vehicle may be calculated as below.

$$X_{FR} = X_N + (OAL - ROH) \times \cos A_N + OAW/2 \times \sin A_N = M_{FR}$$

In the equation, $X_{FR}$ represents the Y value of the front outermost point of the vehicle.

④ If $X_{FR} \geq 0$, entering the parking area is impossible, and as a result, the calculation is completed. On the contrary, if $X_{FR} < 0$, entering the parking area is possible, entering possible recalculation is performed.

⑤ A line that passes a front surface of the vehicle is expressed by an equation as below.

$$Y = -1/\tan(A_N) \times (X - X_{FR}) + Y_{FR}$$

If X=0, a shortest distance from the obstacle is formed. In this case, the vehicle stops when the Y value is the collision avoidance margin.

$$Y = 1/\tan(A_N) \times X_{FR} + Y_{FR} = M_{FR}$$

⑥ The equation is developed as below by using $X_{FR}$ and $Y_{FR}$ in ② and ③.

$$M_{FR} = \cos A_N/\sin A_N \times X_N + (OAL-ROH) \times \cos A_N + OAW/2 \times \sin A_N + Y_N + (OAL-ROH) \times \sin A_N - OAW/2 \times \cos A_N$$

$$M_{FR} \times \sin A_N = \cos A_N \times X_N + (OAL-ROH) \times \cos A_N + OAW/2 \times \sin A_N + \sin A_N \times Y_N + (OAL-ROH) \times \sin A_N - OAW/2 \times \cos A_N = \cos A_N \times X_N + \sin A_N \times Y_N + (OAL-ROH) = \cos A_N \times X_{N-1} + R_{min} \times (\sin A_{N-1} - \sin A_N) + \sin A_N \times Y_{N-1} - R_{min} \times (\cos A_{N-1} - \cos A_N) + (OAL-ROH)$$

$A_N$ is finally summarized as below.

$$-(X_{N-1} + R_{min} \times \sin A_{N-1}) \times \cos A_N + (R_{min} \times \cos A_{N-1} - Y_{N-1} + M_{FR}) \times \sin A_N = OAL-ROH$$

When $A_N$ is calculated, $X_N$ and $Y_N$ may be acquired from the equations.

The above contents are summarized as below.

In N-th Backing $$(R_N - OAW/2)\cos A_N + ROH \times \sin A_N = R_{N-1} + R_N \cos A_{N-1} - W_{Road} + M_{FR}$$

$$X_N = X_{N-1} - R_{min}(\sin A_{N-1} - \sin A_N)$$

$$Y_N = Y_{N-1} + R_{min}(\cos A_{N-1} - \cos A_N)$$

In N-th Fronting $$X_{FR} \geq 0 \qquad \text{i)}$$

$$(R_N - OAW/2)\cos A_N + (OAL-ROH)\sin A_N = -Y_{N-1} + R_N \cos A_{N-1} + M_{FR}$$

$$X_{FR} < 0 \qquad \text{ii)}$$

$$-(X_{N-1} + R_N \sin A_{N-1})\cos A_N + (R_N \cos A_{N-1} - Y_{N-1} + M_{FR})\sin A_N = OAL-ROH$$

$$X_N = X_{N-1} + R_{min}(\sin A_{N-1} - \sin A_N)$$

$$Y_N = Y_{N-1} - R_{min}(\cos A_{N-1} - \cos A_N)$$

Consequently, $A_N$ described blow is expressed in the same format in the N-th front and backing. When Equation 2 is calculated, a result of Equation 3 may be acquired.

$$A\cos A_N + B\sin A_N = C \qquad \text{[Equation 2]}$$
$$u = \cos A_N \Rightarrow \sin A_N = \pm\sqrt{1-u^2}$$
$$\pm B\sqrt{1-u^2} = C - Au$$
$$B^2(1-u^2) = (C-Au)^2$$
$$(A^2+B^2)u^2 - 2ACu + C^2 - B^2 = 0$$
$$u = \frac{AC \pm B\sqrt{A^2+B^2-C^2}}{A^2+B^2} (-1 \leq u \leq 1)$$

$$A_N = \pm\arccos\left(\frac{AC \pm B\sqrt{A^2+B^2-C^2}}{A^2+B^2}\right) \qquad \text{[Equation 3]}$$

Meanwhile, the vehicle is aligned at N times at which $A_N$ reaches −90 degrees and in this case, the control start location is determined to make $X_N$ be the same as a parking target location and a whole head-in perpendicular parking path is calculated.

$A_N = -90$ deg $X_N = -\text{SlotLength}/2$ (that is, parking target location=−parking area length/2)

Figure 10:
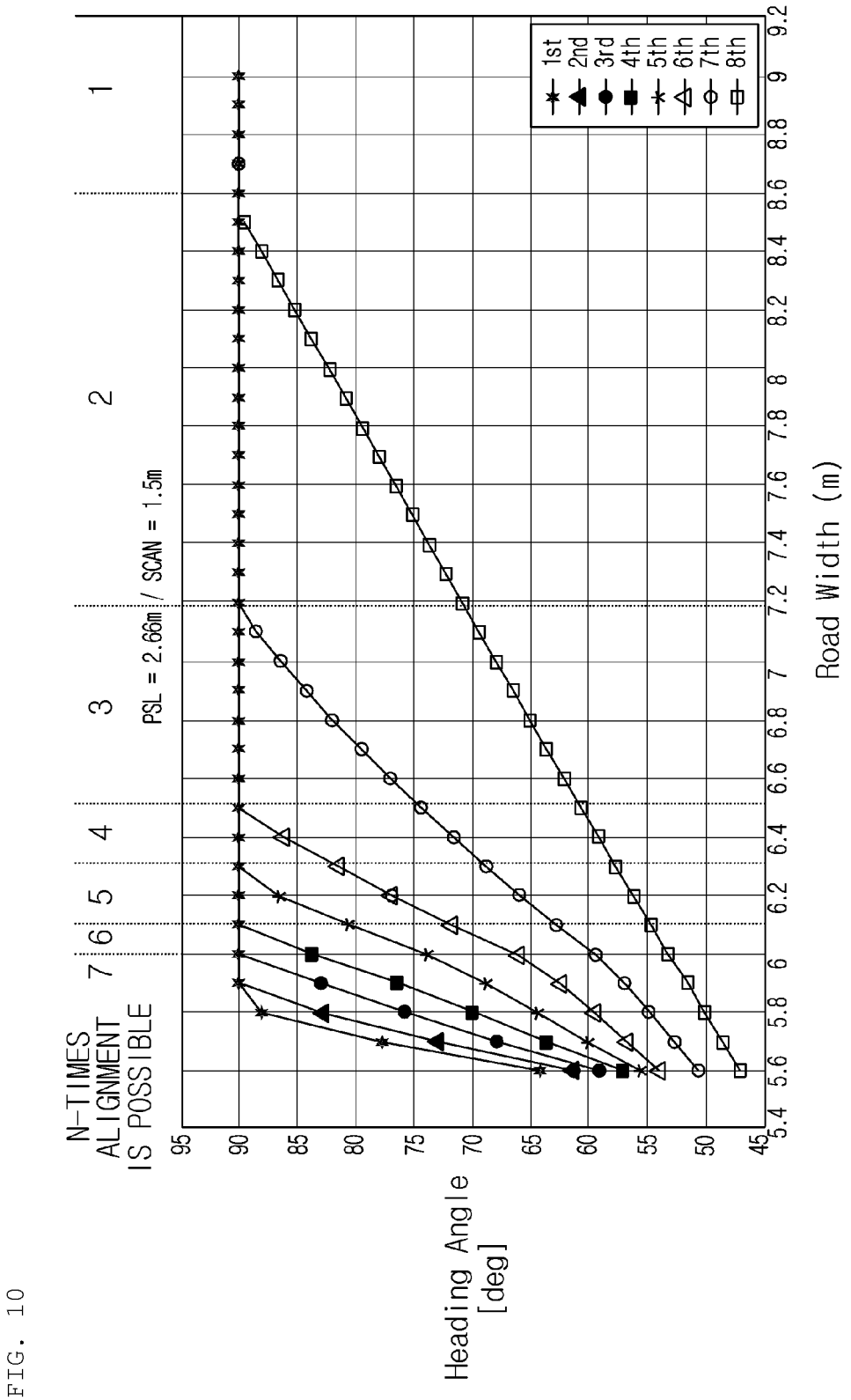
FIGS. 10 and 11 are reference diagrams illustrating a simulation result of the parking assisting process according to the exemplary embodiment of the present invention.
Figure 11:
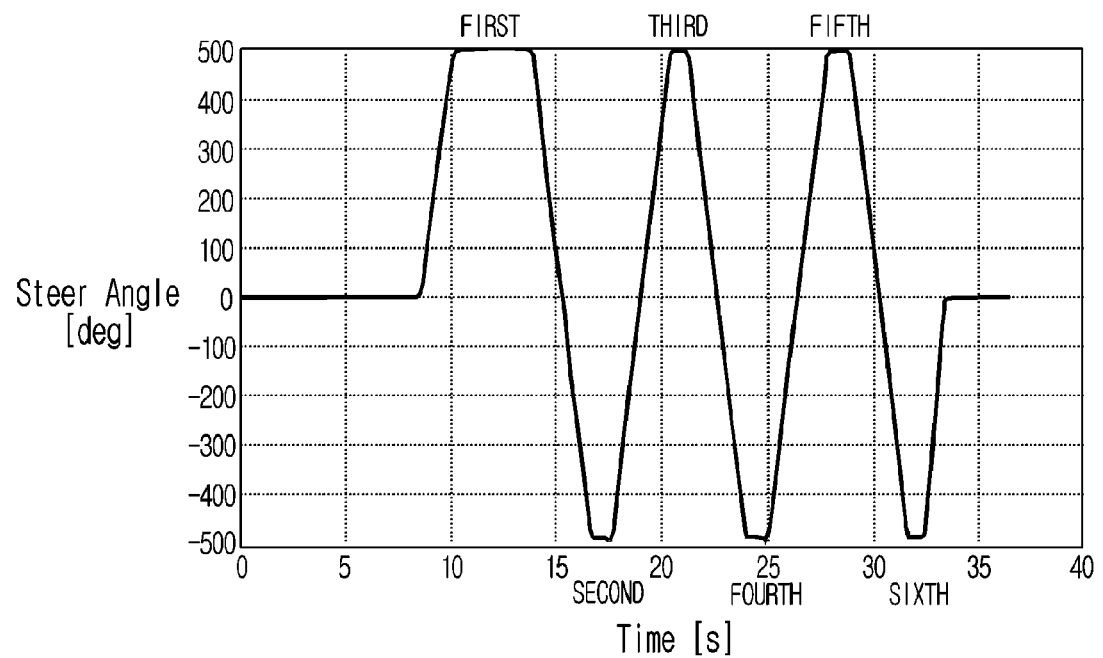

FIGS. 10 and 11 are reference diagrams illustrating a simulation result of the parking assisting process according to the exemplary embodiment of the present invention.

FIG. 10 illustrates a 90-degree alignment time in the N-th fronting/backing depending on the parking area length and the road width. FIG. 11 is a simulation result when the parking area length is approximately 2.66 m (a value acquired by adding the overall width of the vehicle and 0.8 m) and the road width is 6 m. Specially, FIG. 11 illustrates simulation result data by a graph.

Figure 12:
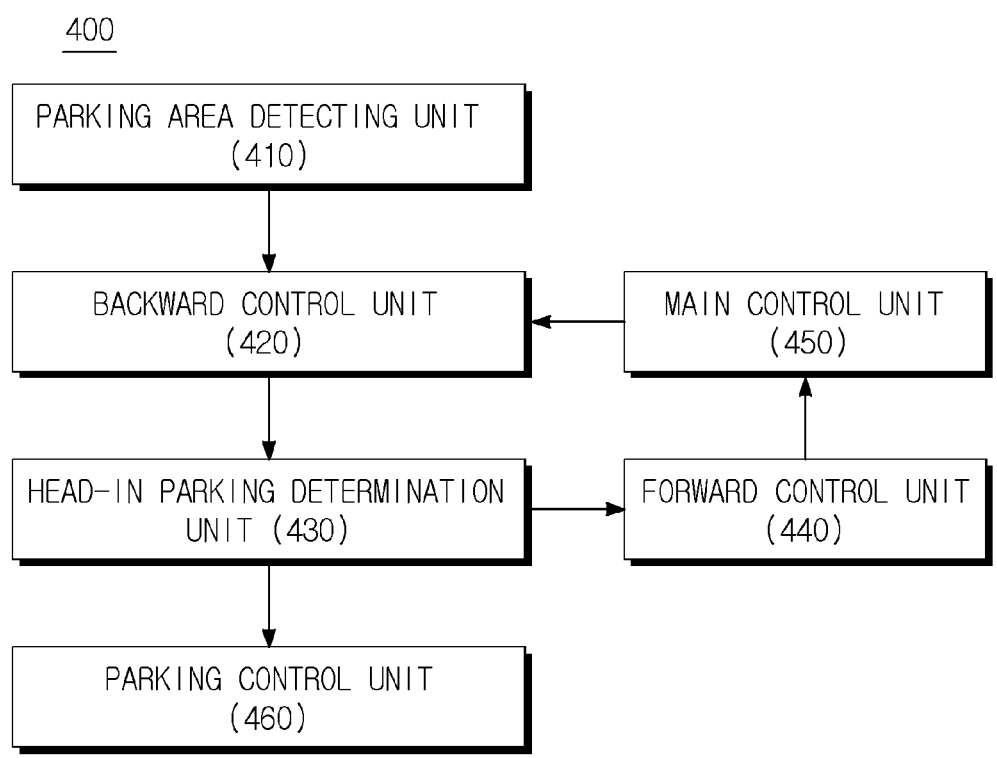
FIG. 12 is a block diagram schematically illustrating an apparatus for controlling head-in perpendicular parking of a vehicle according to an exemplary embodiment of the present invention.

As described above, the method for head-in perpendicular parking according to the present invention has been described with reference to FIGS. 1 to 11. Next, an apparatus that implements the head-in perpendicular parking will be described. FIG. 12 is a block diagram schematically illustrating an apparatus for controlling head-in perpendicular parking of a vehicle according to an exemplary embodiment of the present invention.

Referring to FIG. 12, a head-in perpendicular parking controlling apparatus 400 includes a parking area detecting unit 410, a backward control unit 420, a head-in parking determination unit 430, a forward control unit 440, a main control unit 450, and a parking control unit 460.

Although not illustrated in FIG. 12, the head-in perpendicular parking controlling apparatus 400 may further include a power supply unit supplying power to each internal component. However, when it is considered that the head-in perpendicular parking controlling apparatus 400 may be controlled by an in-vehicle main ECU, the head-in perpendicular parking controlling apparatus 400 may not include the power supply unit.

The parking area detecting unit 410 serves to detect a parking area.

The backward control unit 420 serves to generate a backward path based on positional information of obstacles positioned within a predetermined distance from the parking area and back the vehicle based on the backward path.

The backward control unit 420 may calculate the reachable location and a rotational angle up to the location, and generate the backward path based on the reachable location and the rotational angle.

The backward control unit 420 may calculate the turning center point of the vehicle, calculate a turning radius from the present location to the front outermost point, and calculate the rotational angle so that the nearest point from the obstacles to the front outermost point is larger than the collision avoidance margin.

The backward control unit 420 may calculate the turning radius based on the overall length of the vehicle, the overall width of the vehicle, and the rear overhang, and calculate the nearest point from the obstacles to the front outermost point by using a difference value between the turning center point and the turning radius.

The backward control unit 420 may calculate the reachable location based on a turning radius in the first backing, an overall width of the vehicle, a rear overhang, an initial location of the vehicle, an initial heading angle of the vehicle, a width of a road where the vehicle is driven, and a front/rear collision avoidance margin of the vehicle in initial backing.

The backward control unit 420 may calculate the reachable location based on a minimum turning radius of the vehicle, an overall width of the vehicle, a rear overhang, a previous location of the vehicle, a previous heading angle of the vehicle, a width of a road where the vehicle is driven, and a front/rear collision avoidance margin of the vehicle, from subsequent backing in the initial backing.

The head-in parking determination unit 430 serves to determine whether head-in parking in the parking area is available.

The head-in parking determination unit 430 calculates the front collision avoidance margin of the vehicle and compares the front collision avoidance margin and a reference value to determine head-in parking in the parking area is available. In this case, 0 may be used as the reference value.

The head-in parking determination unit 430 may calculate the front collision avoidance margin based on the target location of the vehicle, the overall length of the vehicle, the rear overhang, the target heading angle of the vehicle, and the overall width of the vehicle.

The forward control unit 440 serves to generate the forward path based on the positional information of the obstacles or positional information of a sectioning line to determine the parking area when it is judged that head-in parking in the parking area is unavailable and front the vehicle based on the forward path.

The forward control unit 440 may calculate a reachable location and a rotational angle up to the location, and generate the forward path based on the reachable location and the rotational angle.

The forward control unit 440 may calculate the reachable location based on the target location of the vehicle, the overall length of the vehicle, the rear overhang, the target heading angle of the vehicle, and the overall width of the vehicle.

The main control unit 450 serves to repeat a backward control and a forward control of the vehicle until it is judged that head-in parking in the parking area is available. The main control unit 450 also serves to control all operations of the respective components constituting the head-in perpendicular parking controlling apparatus 400.

The parking control unit 460 serves to generate a parking path based on the positional information of the obstacles or the positional information of the sectioning line when it is judged that head-in parking in the parking area is available and park the vehicle based on the parking path.

The parking control unit 460 may finally park the vehicle by aligning a temporarily parked vehicle according to the parking path based on the positional information of an obstacle or a sectioning line positioned at least one side of the parking area.

When the obstacle or the sectioning line is positioned at both sides of the parking area, the parking control unit 460 may compare distances from the temporarily parked vehicle to each obstacle or each sectioning line positioned at both sides of the parking area to align the temporarily parked vehicle. When the obstacle or the sectioning line is positioned only at one side of the parking area, the parking control unit 460 may align the temporarily parked vehicle so as to maintain a designated distance from the obstacle or the sectioning line positioned at one side of the parking area.

Next, an operating method of the head-in perpendicular parking controlling apparatus 400 will be described.

First, the parking area detecting unit 410 detects the parking area.

Thereafter, the backward control unit 420 generates a backward path based on positional information of obstacles positioned within a predetermined distance from the parking area and backs the vehicle based on the backward path.

Thereafter, the head-in parking determination unit 430 judges whether head-in parking in the parking area is available.

The forward control unit 440 generates a forward path based on the positional information of the obstacles or positional information of a sectioning line to determine the parking area when it is judged that head-in parking in the parking area is unavailable and fronts the vehicle based on the forward path.

Thereafter, the main control unit 450 repeats the backward control and the forward control of the vehicle until it is judged that head-in parking in the parking area is available.

Meanwhile, the parking control unit 460 generates a parking path based on the positional information of the obstacles or the positional information of the sectioning line when it is judged that head-in parking in the parking area is available and parks the vehicle based on the parking path.

Figure 13:
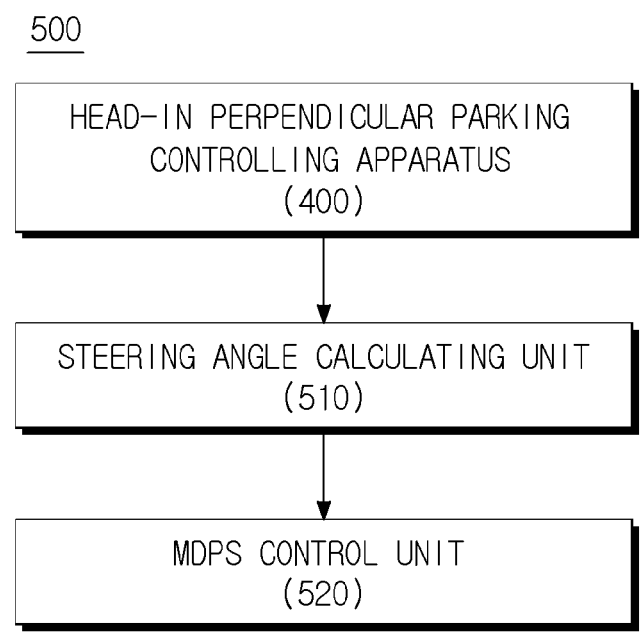
FIG. 13 is a block diagram schematically illustrating a system for head-in perpendicular parking according to an exemplary embodiment of the present invention.

Next, a system for head-in perpendicular parking, which performs perpendicular head-in parking by using the head-in perpendicular parking controlling apparatus 400 will be described. FIG. 13 is a block diagram schematically illustrating a system for head-in perpendicular parking according to an exemplary embodiment of the present invention.

Referring to FIG. 13, a head-in perpendicular parking system 500 includes the head-in perpendicular parking controlling apparatus 400, a steering angle calculating unit 510, and a motor driven power steering (MDPS) control unit 520.

The steering angle calculating unit 510 serves to calculate a steering angle for following the parking path. The MDPS control unit 520 serves to park the vehicle by controlling motor driven power steering (MDPS) based on the steering angle.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling head-in perpendicular parking of a vehicle, the apparatus comprising:
    a parking area detector configured to detect a parking area;
    a backward controller configured to generate a backward path based on positional information of obstacles positioned within a distance from the parking area, to back the vehicle based on the backward path, and to calculate a nearest point from the obstacles to a front outermost point using a difference value between a turning center point of the vehicle and a turning radius;
    a head-in parking determiner configured to determine whether head-in parking in the parking area is available;
    a forward controller configured to generate a forward path based on the positional information of the obstacles or positional information of a sectioning line to determine the parking area, in response to a determination that head-in parking in the parking area is unavailable, and to front the vehicle based on the forward path;
    a main controller configured to repeat a backward control and a forward control of the vehicle using state information until it is determined that head-in parking in the parking area is available; and
    a parking controller configured to generate a parking path based on the positional information of the obstacles or the positional information of the sectioning line, in response to a determination that head-in parking in the parking area is available, and to park the vehicle based on the parking path,
    wherein the parking path is calculated to reach a target location based on a reachable position, a reachable angle, and a control start location,
    wherein the reachable position is a position reachable in an N-th fronting and an M-th backing,
    wherein the reachable angle is an angle reachable in the N-th fronting and the M-th backing, and
    wherein the position reachable at the N-th backing is calculated according to:

$$X_N = X_{N-1} + R_{min} \times \sin(-A_{N-1}) - R_{min} \times \sin(-A_N) = X_{N-1} - R_{min} \times (\sin A_{N-1} - \sin A_N)$$

$$Y_N = Y_{N-1} + R_{min} \times \cos(-A_{N-1}) - R_{min} \times \cos(-A_N) = Y_{N-1} + R_{min} \times (\cos A_{N-1} - \cos A_N)$$

where X is an x-coordinate of the vehicle, Y is a y-coordinate of the vehicle, N is a number of backing iterations, A is a reachable angle, $R_{min}$ is a minimum rotational radius.

2. The apparatus of claim 1, wherein the parking controller is further configured to finally park the vehicle by aligning a temporarily parked vehicle according to the parking path based on positional information of an obstacle or a sectioning line positioned on at least one side of the parking area.

3. The apparatus of claim 2, wherein the parking controller is further configured to compare distances from the temporarily parked vehicle to each obstacle or each sectioning line positioned at both sides of the parking area to align the temporarily parked vehicle, in response to the obstacle or the sectioning line being positioned at both sides of the parking area, and
    the parking controller is further configured to align the temporarily parked vehicle so as to maintain a designated distance from the obstacle or the sectioning line positioned at one side of the parking area, in response to the obstacle or the sectioning line being positioned at only one side of the parking area.

4. The apparatus of claim 1, wherein the backward controller is further configured to calculate a reachable location and a rotational angle up to the reachable location and to generate the backward path based on the reachable location and the rotational angle.

5. The apparatus of claim 4, wherein the backward controller is further configured to calculate the turning center point, to calculate the turning radius from a present location to the front outermost point, and to calculate the rotational angle so that a nearest point from the obstacles to the front outermost point is larger than a collision avoidance margin.

6. The apparatus of claim 5, wherein the backward controller is further configured to calculate the turning radius based on an overall length of the vehicle, an overall width of the vehicle, and a rear overhang, wherein the rear overhang is a distance between a rear wheelbase and a rear of the vehicle.

7. The apparatus of claim 4, wherein the backward controller is further configured to calculate the reachable location based on a turning radius in a first backing, an overall width of the vehicle, a rear overhang, an initial location of the vehicle, an initial heading angle of the vehicle, a width of a road where the vehicle is driven, and a front/rear collision avoidance margin of the vehicle, in initial fronting, wherein the rear overhang is a distance between a rear wheelbase and a rear of the vehicle.

8. The apparatus of claim 7, wherein the backward controller is further configured to calculate the reachable location based on a minimum turning radius of the vehicle, an overall width of the vehicle, a rear overhang, a previous location of the vehicle, a previous heading angle of the vehicle, a width of a road where the vehicle is driven, and a front/rear collision avoidance margin of the vehicle, from subsequent backing in the initial backing, wherein the rear overhang a distance between a rear wheelbase and a rear of the vehicle.

9. The apparatus of claim 1, wherein the head-in parking determiner is further configured to calculate a front collision avoidance margin of the vehicle and to compare the front collision avoidance margin and a reference value to determine whether head-in parking in the parking area is available.

10. The apparatus of claim 9, wherein the head-in parking determiner is further configured to calculate the front collision avoidance margin based on the target location, an overall length of the vehicle, rear overhang, a target heading angle of the vehicle, and an overall width of the vehicle, wherein the rear overhang is a distance between a rear wheelbase and a rear of the vehicle.

11. The apparatus of claim 1, wherein the forward controller is further configured to calculate a reachable location and a rotational angle up to the reachable location, and is further configured to generate the forward path based on the reachable location and the rotational angle.

12. The apparatus of claim 11, wherein the forward controller is further configured to calculate the reachable location based on the target location, an overall length of the vehicle, a rear overhang, the a target heading angle of the vehicle, and an overall width of the vehicle, wherein the rear overhang is a distance between a rear wheelbase and a rear of the vehicle.

13. A method for controlling head-in perpendicular parking of a vehicle, the method comprising:
  detecting a parking area by a parking area detector;
  generating a backward path based on positional information of obstacles positioned within a distance from the parking area and backing the vehicle based on the backward path;
  calculating a nearest point from the obstacles to a front outermost point using a difference value between a turning center point of the vehicle and a turning radius by a backward controller;
  determining whether head-in parking in the parking area is available by a head-in parking determiner;
  generating a forward path based on the positional information of the obstacles or positional information of a sectioning line to determine the parking area, in response to a determination that head-in parking in the parking area is unavailable, and fronting the vehicle based on the forward path by a forward controller;
  repeating a backward control and a forward control of the vehicle using state information until it is determined that head-in parking in the parking area is available by a main controller; and
  generating, by a parking controller, a parking path based on the positional information of the obstacles or the positional information of the sectioning line, in response to a determination that head-in parking in the parking area is available, and parking the vehicle based on the parking path,
  wherein the parking path is calculated to reach a target location based on a reachable position, a reachable angle, and a control start location,
  wherein the reachable position is a position reachable in an N-th fronting and an M-th backing,
  wherein the reachable angle is an angle reachable in the N-th fronting and the M-th backing, and
  wherein the position reachable at the N-th backing is calculated according to:

$$X_N = X_{N-1} + R_{min} \times \sin(-A_{N-1}) - R_{min} \times \sin(-A_N) = X_{N-1} - R_{min} \times (\sin A_{N-1} - \sin A_N)$$

$$Y_N = Y_{N-1} + R_{min} \times \cos(-A_{N-1}) - R_{min} \times \cos(-A_N) = Y_{N-1} + R_{min} \times (\cos A_{N-1} - \cos A_N)$$

where X is an x-coordinate of the vehicle, Y is a y-coordinate of the vehicle, N is a number of backing iterations, A is a reachable angle, $R_{min}$ is a minimum rotational radius.

14. The method of claim 13, wherein the vehicle is finally parked by aligning a temporarily parked vehicle according to the parking path based on positional information of an obstacle or a sectioning line positioned on at least one side of the parking area.

15. The method of claim 13, wherein a reachable location and a rotational angle up to the location are calculated and the backward path is generated based on the reachable location and the rotational angle.

16. The method of claim 13, wherein a front collision avoidance margin of the vehicle is calculated and the front collision avoidance margin and a reference value are compared to determine whether head-in parking in the parking area is available.

17. A system for head-in perpendicular parking of a vehicle, the system comprising:
  a parking area detector configured to detect a parking area;
  a backward controller configured to generate a backward path based on positional information of obstacles positioned within a distance from the parking area, to back the vehicle based on the backward path, and to calculate a nearest point from the obstacles to a front outermost point using a difference value between a turning center point of the vehicle and a turning radius;
  a head-in parking determiner configured to determine whether head-in parking in the parking area is available;
  a forward controller configured to generate a forward path based on the positional information of the obstacles or positional information of a sectioning line to determine the parking area, in response to a determination that head-in parking in the parking area is unavailable, and to front the vehicle based on the forward path;
  a main controller configured to repeat a backward control and a forward control of the vehicle using state information until it is determined that head-in parking in the parking area is available;
  a parking controller configured to generate a parking path based on the positional information of the obstacles or the positional information of the sectioning line, in response to a determination that head-in parking in the parking area is available;
  a steering angle calculator configured to calculate a steering angle for following the parking path; and
  a motor driven power steering (MDPS) controller configured to park the vehicle by controlling the MDPS based on the steering angle,
  wherein the parking path is calculated to reach a target location based on a reachable position, a reachable angle, and a control start location,
  wherein the reachable position is a position reachable in an N-th fronting and an M-th backing,
  wherein the reachable angle is an angle reachable in the N-th fronting and the M-th backing, and
  wherein the position reachable at the N-th backing is calculated according to:

$$X_N = X_{N-1} + R_{min} \times \sin(-A_{N-1}) - R_{min} \times \sin(-A_N) = X_{N-1} - R_{min} \times (\sin A_{N-1} - \sin A_N)$$

$$Y_N = Y_{N-1} + R_{min} \times \cos(-A_{N-1}) - R_{min} \times \cos(-A_N) = Y_{N-1} + R_{min} \times (\cos A_{N-1} - \cos A_N)$$

where X is an x-coordinate of the vehicle, Y is a y-coordinate of the vehicle, N is a number of backing iterations, A is a reachable angle, $R_{min}$ is a minimum rotational radius.

18. The apparatus of claim 1, wherein a Y value at the front outermost point of the vehicle is acquired according to:

$$Y_{FR}=Y_N+(OAL-ROH)\times\sin A_N-OAW/2\times\cos A_N=M_{FR}$$

where $Y_{FR}$ is a Y value of the front outermost point of the vehicle, OAW is an overall width of the vehicle, OAL is an overall length of the vehicle, ROH is a rear overhang, and $M_{FR}$ is a front/rear collision avoidance margin.

19. The apparatus of claim 1, wherein the state information further comprises wheel pulse, steering angle, and speed.

* * * * *